(12) United States Patent
Nishio et al.

(10) Patent No.: US 7,787,071 B2
(45) Date of Patent: Aug. 31, 2010

(54) DISPLAY DEVICE

(75) Inventors: Toshiya Nishio, Tottori (JP); Jiro Isoo, Tsuruga (JP)

(73) Assignee: Epson Imaging Devices Corporation (JP)

( * ) Notice: Subject to any disclaimer, the term of this patent is extended or adjusted under 35 U.S.C. 154(b) by 225 days.

(21) Appl. No.: 12/079,626

(22) Filed: Mar. 27, 2008

(65) Prior Publication Data
US 2008/0239195 A1 Oct. 2, 2008

(30) Foreign Application Priority Data
Mar. 28, 2007 (JP) .............................. 2007-083653

(51) Int. Cl.
*G02F 1/1333* (2006.01)
*G02F 1/1347* (2006.01)
(52) U.S. Cl. .......................................... 349/58; 349/77
(58) Field of Classification Search .................... 349/58, 349/61, 62, 73, 74, 77
See application file for complete search history.

(56) References Cited

U.S. PATENT DOCUMENTS

| | | | |
|---|---|---|---|
| 6,504,587 B1 * | 1/2003 | Morishita et al. .............. | 349/58 |
| 6,636,282 B2 * | 10/2003 | Ogawa et al. ................. | 349/58 |
| 6,741,301 B2 * | 5/2004 | Tsuji ............................ | 349/58 |
| 6,906,762 B1 | 6/2005 | Witehira et al. | |
| 7,580,250 B2 * | 8/2009 | Shin et al. .............. | 361/679.21 |
| 2005/0174028 A1 * | 8/2005 | Jung et al. ................... | 313/309 |
| 2006/0290594 A1 | 12/2006 | Engel et al. | |

FOREIGN PATENT DOCUMENTS

| | | |
|---|---|---|
| JP | 05-040261 | 2/1993 |
| JP | 06-339575 | 12/1994 |
| JP | 3335998 | 8/2002 |
| JP | 2004-038145 | 2/2004 |
| JP | 2004-212860 | 7/2004 |
| JP | 2005-533275 | 4/2005 |
| JP | 2005-222944 | 8/2005 |

* cited by examiner

*Primary Examiner*—Akm E Ullah
(74) *Attorney, Agent, or Firm*—Harness, Dickey & Pierce, P.L.C.

(57) ABSTRACT

A display device 1 of an embodiment of the invention has a first display panel (10A), a second display panel (10B) that is disposed behind the first display panel (10A), a front rim 20 that is disposed in front of the first display panel (10A), an intermediate cases (30, 35) that are disposed between the first display panel (10A) and the second display panel (10B), and support the first display panel (10A) and the second display panel (10B), and a backlight 40 that is provided behind the second display panel (10B). At least the front rim 20, intermediate cases (30, 35) and backlight 40 are provided with fixing holes 23a, 33a, 38a, 44a in their corners, and fixing is effected integrally at each corner. Thanks to such structure, a display device is provided in which the distance between the two display panels can be altered by an inexpensive method.

5 Claims, 8 Drawing Sheets

(prior art)

DISPLAY DEVICE

BACKGROUND

1. Technical Field

The present invention relates to a display device, and more particularly to a display device in which two display panels are superposed, in order to display images of diverse kinds, and the spacing between the two panels can be altered via simple structural means.

2. Related Art

Some display devices effect displays by deploying two display panels superposed, with the object of enhancing the stereoscopic effect or realism of the display screen. An example of such a display device is disclosed in JP-A-6-339575.

FIG. 8 is a cross-sectional view of a display device of JP-A-6-339575, which is used in a pin-ball machine.

The display device 100 disclosed in JP-A-6-339575, which is used in a pin-ball machine, is composed of two liquid crystal displays (LCDs) 101 and 102. As FIG. 8 shows, these two LCDs 101, 102 are well-known thin film transistor (TFT) type color LCDs, and are disposed in parallel, with the LCD 101 at the front, the LCD 102 at the rear, and a space left therebetween. The LCDs 101, 102 are well-known items with, for example, stacked from rear to front in the order given: a polarization film 106, a glass substrate 107, a drive section 108 constituted of TFTs, an alignment layer 109, liquid crystal 110 in which particles serving as spacers are dispersed, another alignment layer 109, a common electrode 111 constituted of ITO, a protective layer 112, color filters 113, another glass substrate 107, and another polarization film 106. Also, a backlight 114 constituted of a planar light-emitting body is installed to the rear surface of the rear LCD 102.

Because of the use purpose of the display device disclosed in JP-A-6-339575, it is not envisaged that the distance between the front LCD 101 and the rear LCD 102 will be varied. However, the use of two superposed display panels (LCDs) has been widely practiced in recent years for purposes other than the device disclosed in JP-A-6-339575, such as for 3D displays. With such display devices that employ two display panels to effect displays, the distance between the display panels must be altered depending on the items to be displayed.

Where it is necessary to alter the distance between the two display panels as stated above, usually the display device's case itself must also be altered. For this reason, it becomes necessary to prepare multiple types of cases corresponding to various distances between the two panels in order to meet the needs of each user. Hence there is the problem that, due to such need to specially prepare extra cases, the display device as a whole becomes costly.

SUMMARY

The inventors arrived at the present invention upon discovering, as a result of many and varied investigations into configurations that might enable the distance between the two display panels to be altered without altering various components of the display device as much as possible, that the foregoing problem can be resolved by altering the structure for fixing the display device's case.

An advantage of some aspects of the invention is to provide a display device in which the distance between the two display panels can be altered by an inexpensive method.

According to an aspect of the invention, a display device includes: a first display panel; a second display panel that is disposed behind the first display panel; a front rim that is disposed in front of the first display panel; an intermediate case that is disposed between the first display panel and the second display panel, and supports the first display panel and the second display panel; and a backlight that is provided behind the second display panel. The display panel has the innovative feature that at least the front rim, the intermediate case, and the backlight are provided with a fixing hole in each corner and fixing is effected integrally at each corner.

With such aspect of the invention, the front rim, intermediate case and backlight are fixed by means of fixing holes provided in each corner thereof, and thereby the various components are integrally fixed. Thus, the device has a simple fixing structure and so can be manufactured inexpensively. Through adoption of such fixing structure, if for example it is desired to alter the distance between the first and second display panels, such alteration can be effected merely by altering the thickness of the intermediate case, without altering any other component.

Also, in such display device the front rim may be formed in a picture-frame shape, with sidewalls formed perpendicularly at the periphery thereof, and moreover a rear cover constituted of a rectangular plate body and with sidewalls erected at the periphery thereof may be provided at the rear of the backlight, with the sidewalls of such rear cover being so fixed to the front rim's sidewalls that the fixing position thereof is alterable.

With such feature, the front rim normally used in the display device will be constituted of thin metal sheet, which means that using such rear cover will enable the mechanical strength of the display device to be increased. When such rear cover is used, the control board and other items for display panel drive that are disposed on the rear face of the backlight can be protected from external forces. Also, since the rear cover, if used, is fixed to the front rim in such a way that the fixing position is alterable, there will be no need to alter the rear cover even if the interpanel distance is altered.

Also, in such display device the intermediate case may be composed of plural members—a first case and a second case—with the first case supporting the first display panel, a moire eliminating film being disposed behind the first case, the second case being positioned between the moire eliminating film and the second display panel, and supporting the moire eliminating film and the second display panel, and the fixing hole being provided in each corner of the first case and the second case.

With such feature, the intermediate case is divided into two—a first and a second case—and a moire eliminating film is disposed between such two cases. Thereby, the moire phenomenon that arises between the first and second liquid crystal display panels can be satisfactorily curbed.

Also, in such display device the first display panel and the second display panels may be constituted of liquid crystal display panels.

Also, in such display device the backlight may be a planar light source constituted of a field emission display that uses carbon nanotubes (CNT-FED).

With such feature, liquid crystal display panels having the same structure can be employed for the first and second display panels. Additionally, a planar light source constituted of a CNPFED can be employed for the backlight, and thus the backlight itself can be rendered thin.

Also, in such display device the first display panel may be constituted of a liquid crystal display panel, and a CNT-FED serve as both the second display panel and the backlight.

With such feature, a CNT-FED, that is, a single structural member, can be used to realize both the second display panel and the backlight, so that the display device as a whole can be rendered even thinner.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment of the present invention will now be described with reference to the accompanying drawings. It should be understood however that the following embodiment is intended by way of example of a display device that carries out the technical concepts of the invention, not by way of limiting the invention to this particular display device. The invention could equally well be adapted by those skilled in the art to yield other embodiments within the scope and spirit of the claims.

First Embodiment

Figure 1:
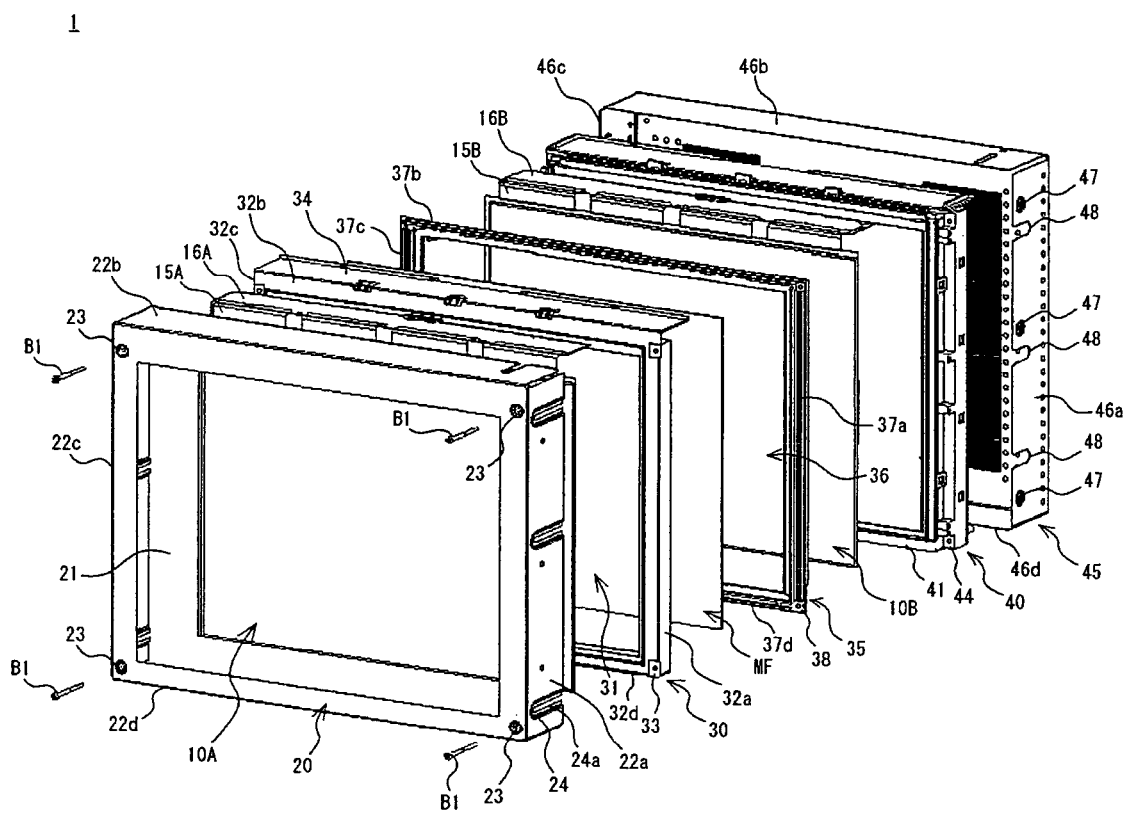
FIG. 1 is an exploded perspective view illustrating a liquid crystal display device in an embodiment of the invention.
Figure 2:
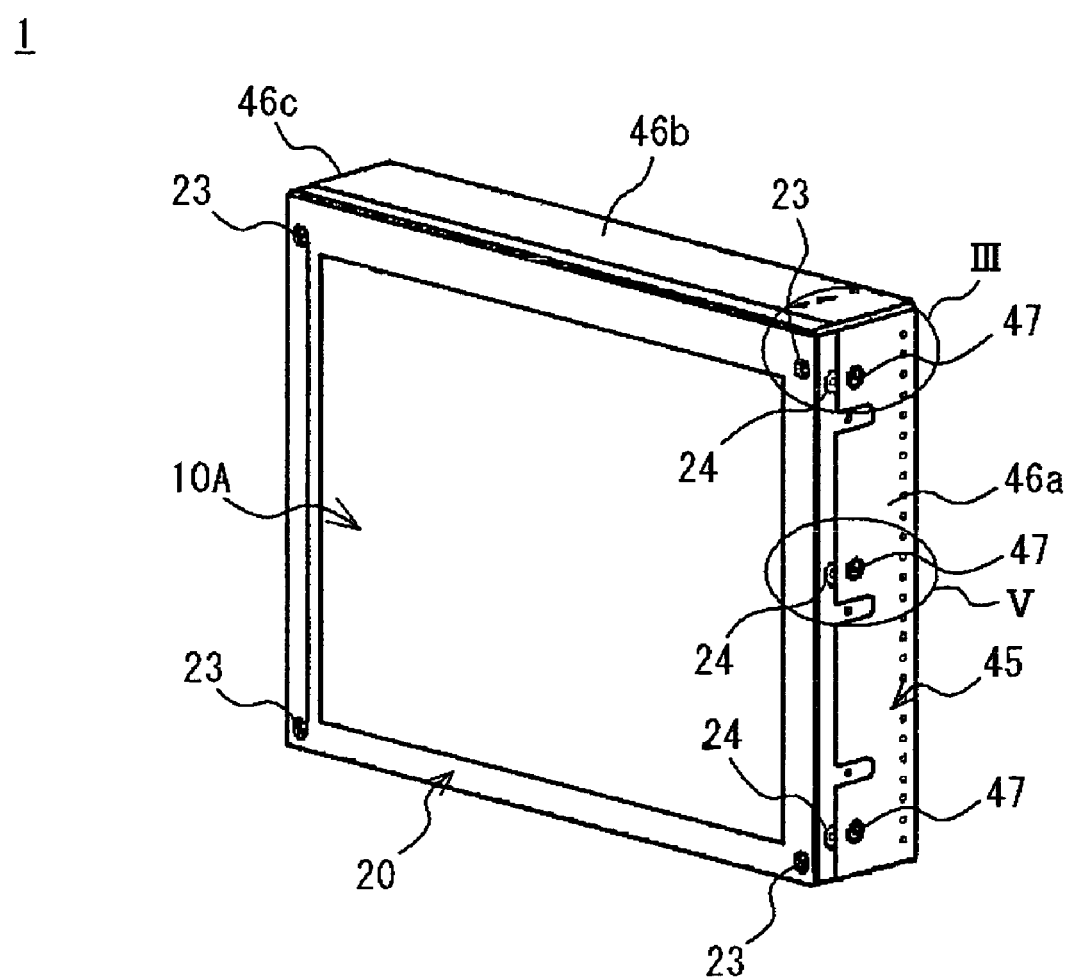
FIG. 2 is a perspective view illustrating display panels of FIG. 1 in the assembled state.
Figure 3:
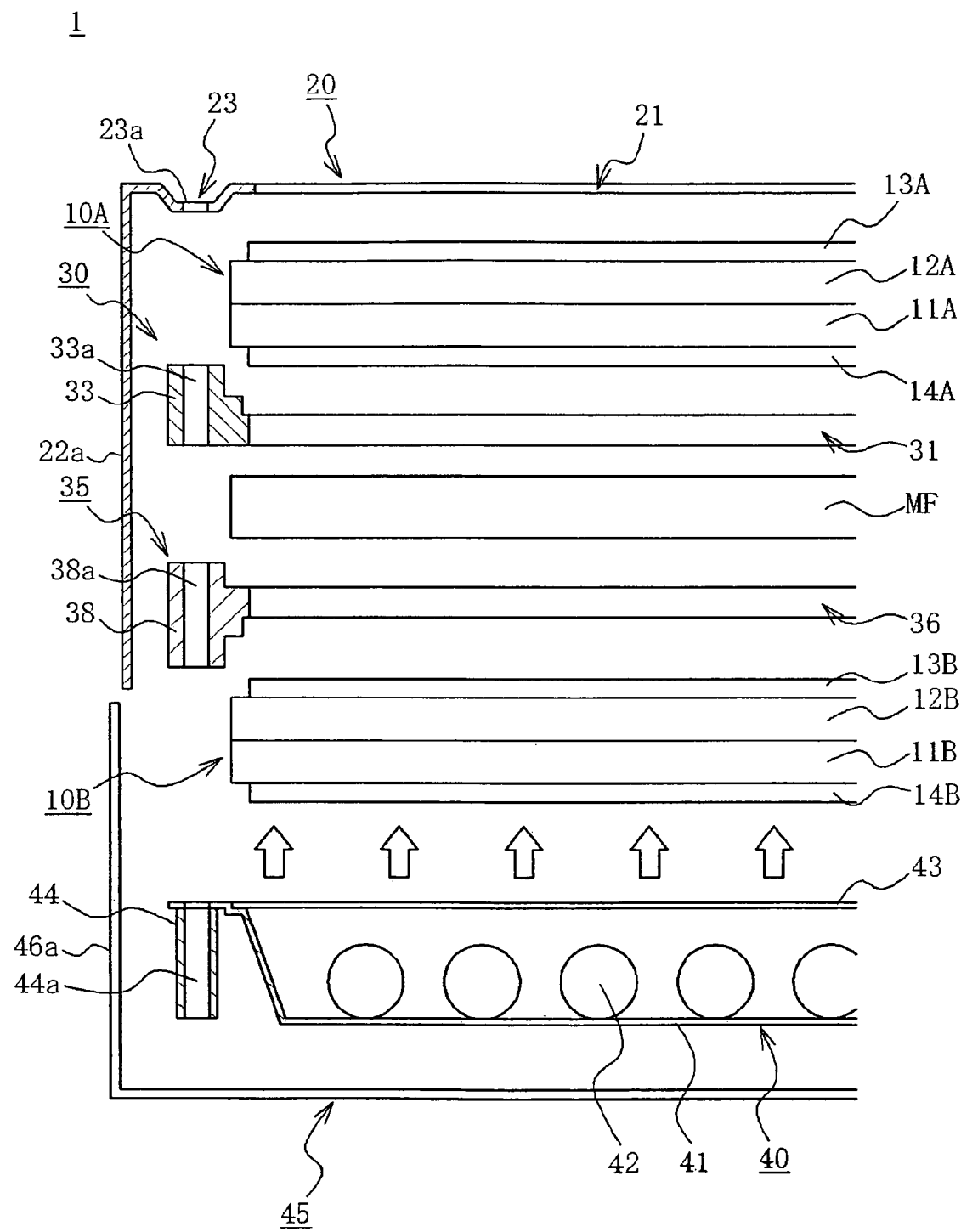
FIG. 3 is an exploded schematic cross-sectional view of portion III in FIG. 2.
Figure 4:
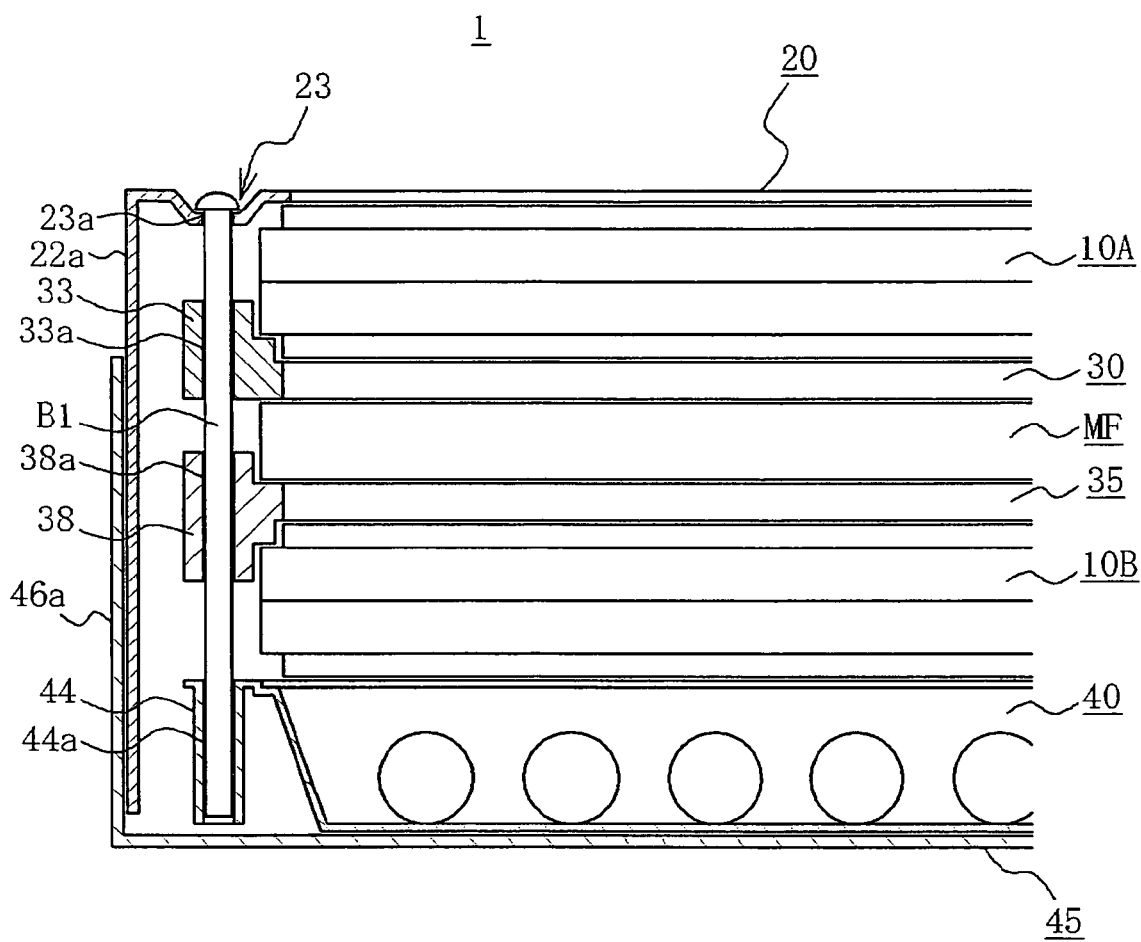
FIG. 4 is a schematic cross-sectional view of the display device in FIG. 3 in the assembled state.
Figure 5:
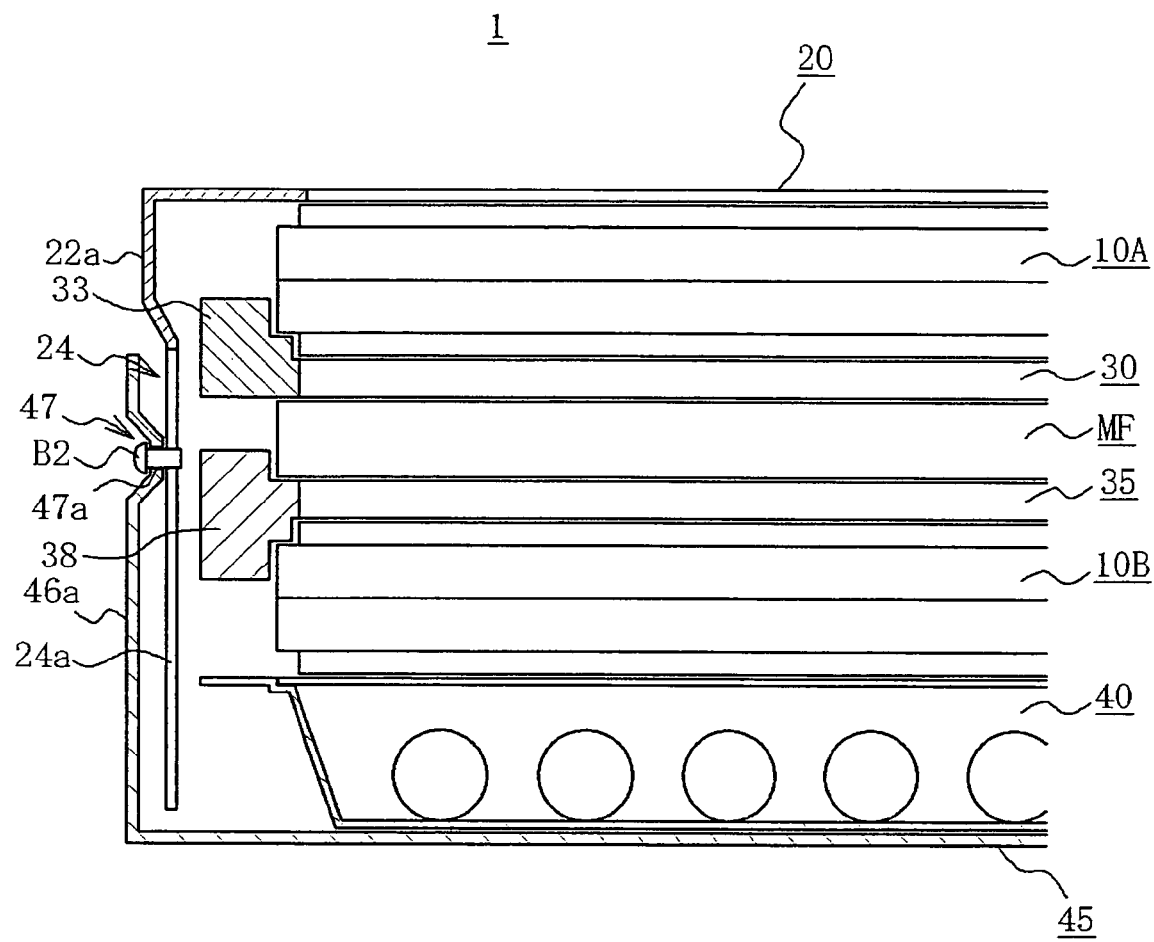
FIG. 5 is an exploded schematic cross-sectional view of portion V in FIG. 2.

FIG. 1 is an exploded perspective view of a display device in a first embodiment of the invention, FIG. 2 is a perspective view illustrating display panels of FIG. 1 in the assembled state, FIG. 3 is an exploded schematic cross-sectional view of portion III in FIG. 2, FIG. 4 is a schematic cross-sectional view of the display device in FIG. 3 in the assembled state, and FIG. 5 is a schematic cross-sectional view of portion V in FIG. 2.

As FIGS. 1 and 2 show, a display device 1 of the invention is composed of: a first liquid crystal display panel 10A and second liquid crystal display panel 10B constituting first and second display panels; a front rim 20 that covers the periphery of the front of the first liquid crystal display panel 10A; first and second cases 30 and 35, plus a moire eliminating film MF, that form an intermediate case and are provided between the first and second liquid crystal display panels 10A, 10B; and a backlight 40 and rear cover 45 that are provided behind the second liquid crystal display panel 10B.

As FIGS. 1 and 3 show, the first LCD panel 10A and second LCD panel 10B have array substrates 11A, 11B constituted of a rectangular glass substrate with various wirings for LC drive provided on the surface thereof, and color filter substrates 12A, 12B likewise constituted of a rectangular glass substrate with various wirings, color filters and so forth provided on the surface thereof. The array substrates 11A and 11B are superposed over the color filter substrates 12A and 12B respectively—in each case in such a manner that the array substrate and color filter oppose each other—and are bonded together using seal material. The space between each such substrate pair (between 11A and 12A and between 11B and 12B) is then filled with liquid crystal, thus forming the assembled LCD panels 10A and 10B. Further, polarization filters 13A, 14A and 13B 14B are bonded onto the two faces of the first and second LCD panels 10A and 10B respectively after the filling with liquid crystal. Also, wiring is passed around the top edge of the assembled first and second LCD panels 10A, 10B and electrically connected to control boards 16A, 16B via FPCs 15A, 15B.

The front rim 20, as FIGS. 1, 3 and 5 show, is formed approximately in the shape of a picture-frame, covering the periphery of the front of the first LCD panel 10A and with a window portion 21 in the center. At the outer edge of this frame-like part, sidewalls 22a to 22d of a particular length are formed perpendicularly extending toward the first LCD panel 10A. Additionally, near the four corners of the front rim 20 (frame-like part) there are formed screw insertion holes 23a into which fixing screws B1 to be described hereafter fit. Around the peripheries of such screw insertion holes 23a there are reamed portions 23 that have been reamed into a hollow-ground form so as to accommodate the heads of the fixing screws B1. Further, in the left and right sidewalls 22a and 22c among the sidewalls 22a to 22d there are provided multiple slits 24a (three in each sidewall (left and right) in the example of the present embodiment) running from the rear edge toward the front edge thereof. The edges of these slits 24a are formed as long hollows 24 that contact against the second hollows 47 provided in the left and right sidewalls 46a, 46c of the rear cover 45 to be described hereafter.

The first case 30, as FIGS. 1 and 3 show, is formed as a frame-like member having a window portion 31 in the center, by combining together four long square support pieces 32a to 32d. Particular stepped portions or the like are formed on the front of these square support pieces 32a to 32d so as to enable installation of the first LCD panel 10A thereto. Also, fixing portions 33 are formed at the connecting portions of these square support pieces 32a to 32d, or in other words at the corners of the first case 30. In these fixing portions 33 there are provided fixing holes 33a that communicate with the fixing holes 23a provided in the reamed portions 23 of the front rim 20. Further, on the top support piece 32b which constitutes one of the four edges, there is provided a dividing wall 34 that electrically separates the control boards 16A and 16B that are connected to the first and second LCD panels 10A, 10B respectively.

The moire eliminating film MF is provided in order to curb the moire (interference fringe) phenomenon that arises between the first and second LCD panels 10A, 10B, and is formed from diffusion film.

The second case 35, as FIGS. 1 and 3 show, is formed as a frame-like member having a window portion 36 in the center, by combining together four long square support pieces 37a to 37d. Particular stepped portions or the like are formed on the front of these square support pieces 37a to 37d so as to enable installation of the moire eliminating film MF, and on the rear thereof so as to enable installation of the second LCD panel 10B. Also, fixing portions 38 are formed at the connecting portions of these square support pieces 37a to 37d, or in other words at the corners of the second case 35. In these fixing portions 38 there are provided fixing holes 38a that communicate with the fixing holes 23a provided in the reamed portions 23 of the front rim 20 and with the fixing holes 33a in the first case 30.

The backlight 40, as FIGS. 1 and 3 show, is composed of a backlight case 41 shaped as a rectangular plate with outer edges bent forward at a particular angle, multiple cold cathode fluorescent tubes 42 that are housed inside the backlight case 41, and an optical film 43 constituted of photochromic film, diffusion film or the like that covers the front opening of the backlight case 41. The cold cathode fluorescent tubes 42 are, say, arrayed in parallel in the display device 1's longitudinal direction. Also, fixing portions 44 are provided in the four corners of the backlight case 41, and in these fixing portions 44 there are provided fixing holes 44a that communicate with the fixing holes 23a, 33a and 38a provided in the aforementioned front rim 20 and first and second cases 30 and 35 respectively.

The rear cover 45, as FIGS. 1 to 5 show, is constituted of a rectangular metal plate with forward-pointing sidewalls 46a to 46d erected at the four edges thereof and separated from each other. In between the sidewalls 46a to 46d are gaps in the form of elongated slits, and furthermore, in at least the left and right sidewalls 46a, 46c there are provided cutouts 48 of a particular length extending rearward from the front edge thereof. Such gaps and cutouts 48 are provided for the sake of enhancing workability during fitting of the various components described above into the rear cover 45. Also, at the positions on the left and right sidewalls 46a, 46c that correspond to the front rim 20's long hollows 24 there are provided flat-bottomed second hollows 47, in the centers of which there are provided insertion holes 47a for insertion of support screws B2 (see FIG. 5).

The process of assembling the display device 1 of the present embodiment will now be described with reference to FIGS. 1 to 5.

First of all, the second LCD panel 10B, second case 35, moire eliminating film MF, first case 30 and first LCD panel 10A are stacked onto the backlight 40 in the order given. Then the front rim 20 is disposed onto such stack so as to cover the front periphery of the first LCD panel 10A and so that the foregoing components are housed inside the sidewalls 22a to 22d of the front rim 20. Next, with such state, the fixing screws B1 are inserted and screwed into the fixing holes 23a in the first reamed portions 23 provided in the front rim 20. Thanks to female threads created in advance on the insides of the fixing holes 33a, 38a and 44a provided in the first and second cases 30, 35 and the backlight 40, the fixing screws B1 are made to screw into the fixing holes 33a, 38a and 44a, robustly securing all the members.

The assembly consisting of the front rim 20, first and second LCD panels 10A, 10B, first and second cases 30, 35, moire eliminating film MF and backlight 40 integrally fixed together by the fixing screws B1 in the above manner is now fitted into the rear cover 45. This fitting of such assembly into the rear cover 45 is effected in such a manner that the long hollows 24 provided in the left and right sidewalls 22a, 22c of the front rim 20 and the second hollows 47 provided in the left and right sidewalls 46a, 46c of the rear cover 45 contact against each other, in which state, the second hollows 47 slide along the long hollows 24.

When the aforementioned assembly is fitted into the rear cover 45, the rear face of the backlight cover 41 contacts against the bottom of the rear cover 45's interior. With such state, the support screws B2 are inserted and screwed into the insertion holes 47a in the second hollows 47 to fix the rear cover 45. This step completes assembly of the display device 1.

Figure 6:
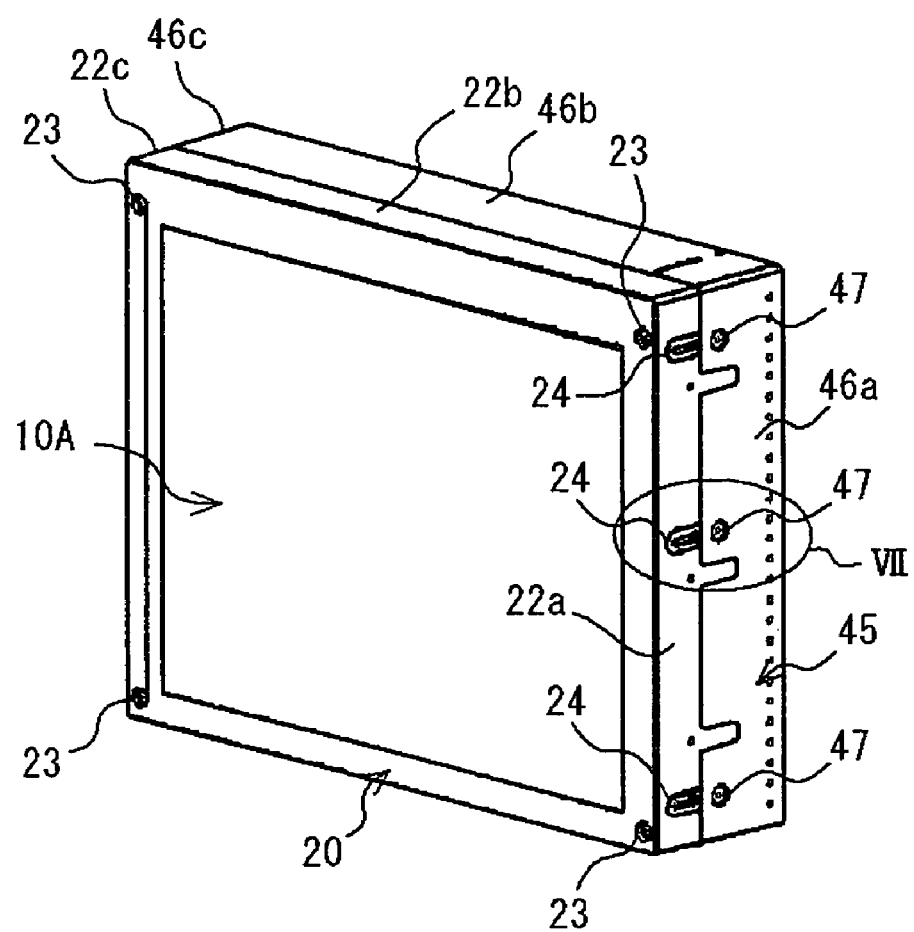
FIG. 6 is a perspective view illustrating the display device in FIG. 2 with the distance between the display panels altered.
Figure 7:
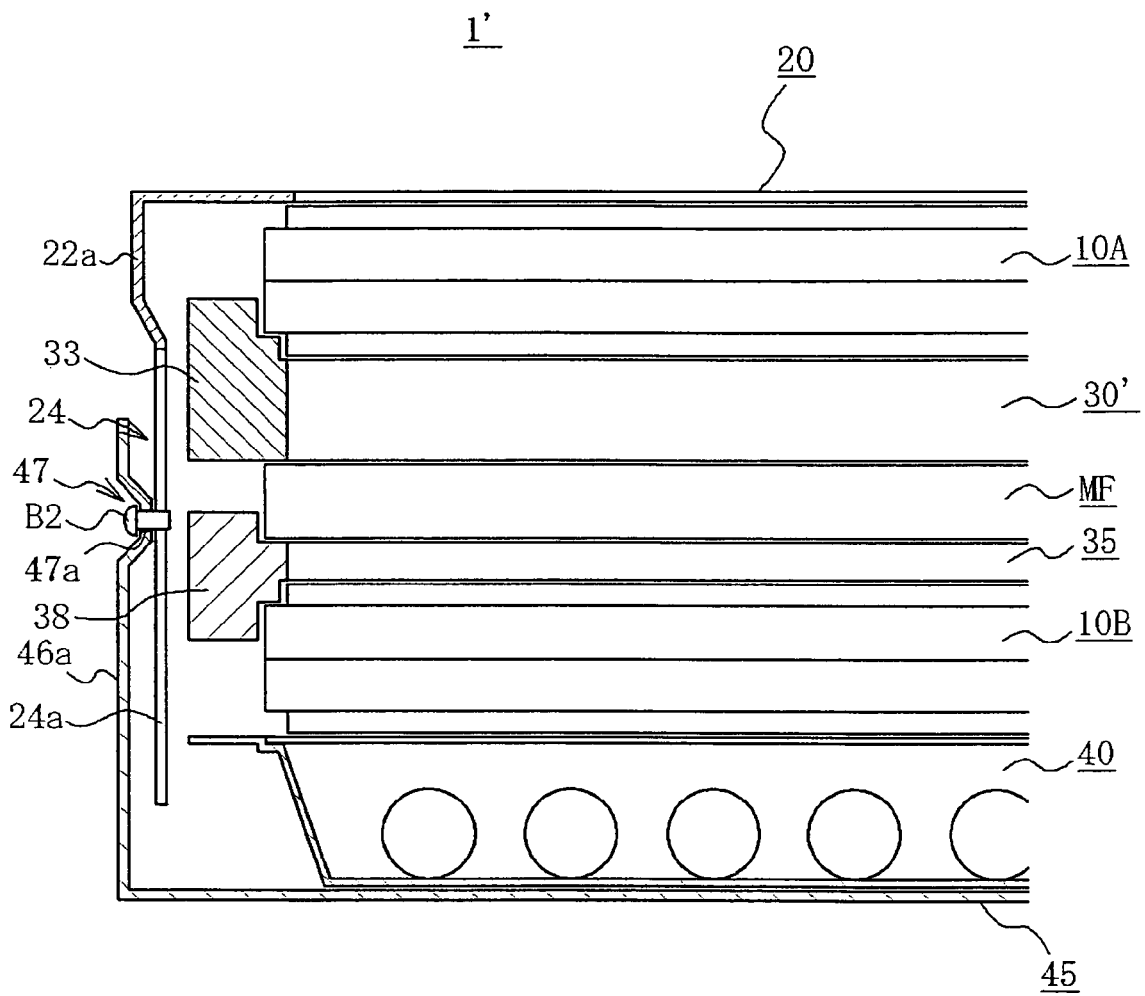
FIG. 7 is a schematic cross-sectional view of portion VII in FIG. 6.
Figure 8:
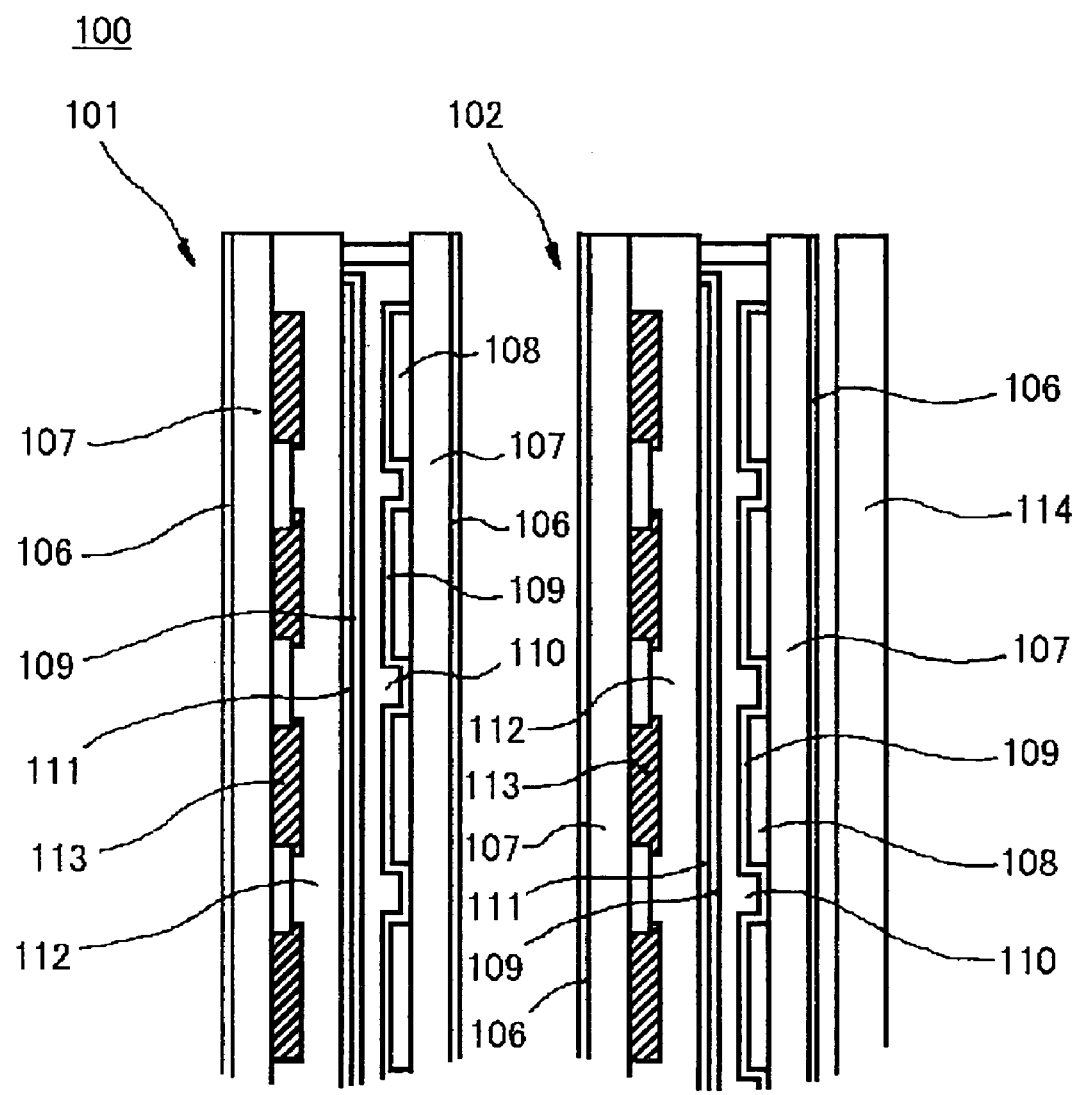
FIG. 8 is a cross-sectional view of a display device of the related art.

FIG. 6 is a perspective view illustrating the display device in FIG. 2 with the distance between the display panels altered, and FIG. 7 is a schematic cross-sectional view of portion VII in FIG. 6. The display device 1' in FIGS. 6 and 7 has only the first case 30 altered, the other structural elements being those of the display device 1 unaltered.

Compared with the first case 30 of the display device 1, the first case 30' of the display device 1' has a different thickness but in other respects has identical structure. Thus, the purpose of employing the first case 30' is to alter the distance between the first and second LCD panels 10A, 10B.

The display device 1' is assembled through the same assembly process as for the display device 1 above. But when the assembly consisting of the front rim 20, first and second LCD panels 10A, 10B, first and second cases 30', 35, moire eliminating film MF and backlight 40 is fitted into the rear cover 45, the rear face of the backlight cover 41 contacts against the bottom of the rear cover 45's interior with a longer depthwise dimension compared to the display device 1. However, the rear cover 45 and front rim 20 are secured by screwing in the support screws B2 at the portions where the long hollows 24 and second hollows 47 contact. Therefore the rear cover 45 and front rim 20 can be used unchanged, with the same structure as in the display device 1.

Thus, with a display device 1, 1' of the invention, the inter-panel distance can be altered in a simple manner, that is, merely by altering the first case 30 alone among the various component members. Also, since fixing bolts B1 are used to fix the various members, the foregoing advantage can be obtained with a simple structure.

Also, since the front rim 20 in a display device 1, 1' of the invention is constituted of thin metal plate, the mechanical strength of the display device 1, 1' can be increased by the use of a rear cover 45 such as described above. Using such a rear cover 45 will protect from external forces the control boards 16A, 16B or the like, for first and second LCD panels 10A, 10B drive, that are disposed on the rear face or at the side face of the backlight 40. Also, the rear cover 45, if used, will be fixed to the front rim 20 in such a manner that the fixing position thereof is alterable, so that even if the distance between first LCD panel 10A and second LCD panel 10B is altered there will be no need to alter the rear cover 45.

In the foregoing embodiment, by way of example, an LCD panel is described as being employed for the second display panel and a cold cathode fluorescent tube as being employed for the backlight, but the invention is not limited to such items. As specific examples of alternatives, a planar light source constituted of a field emission display that uses carbon nanotubes (a CNT-FED) could be employed for the backlight, or the second display panel and backlight could be formed as an integrated item by using a CNT-FED.

What is claimed is:

1. A display device comprising:
a first display panel;
a second display panel disposed behind the first display panel;
a front rim disposed in front of the first display panel;
an intermediate case disposed between the first display panel and the second display panel, and supporting the first display panel and the second display panel; and
a backlight provided behind the second display panel;
at least the front rim, the intermediate case, and the backlight being provided with a fixing hole in each corner and being integrally fixed at each corner;
the front rim is formed in a picture-frame shape with sidewalls formed perpendicularly at the periphery thereof;
a rear cover is provided at a rear of the backlight, the rear cover comprising a rectangular plate body with sidewalls vertically provided from the periphery thereof;

long hollows provided in left and right sidewalls of the front rim and second hollows provided in left and right sidewalls of the rear cover contact against each other in a state in which the second hollows slide along the long hollows; and the sidewalls of the rear cover are fixed to the side walls of the front rim so that a fixing position thereof is changeable.

2. The display device according to claim 1, wherein the intermediate case comprises a first case and a second case;

the first case supports the first display panel;

a moire eliminating film is disposed behind the first case;

the second case is positioned between the moire eliminating film and the second display panel and supports the moire eliminating film and the second display panel; and the fixing hole is provided in each corner of the first case and the second case.

3. The display device according to claim 1, wherein the first display panel and the second display panel are liquid crystal display panels.

4. The display device according to claim 3, wherein the backlight is a planar light source comprising a field emission display employing carbon nanotubes.

5. The display device according to claim 1, wherein the first display panel is a liquid crystal display panel; and each of the second display panel and the backlight employs a field emission display employing carbon nanotubes.

* * * * *